United States Patent
Yang

(10) Patent No.: US 11,209,850 B2
(45) Date of Patent: Dec. 28, 2021

(54) TERMINATION VOLTAGE REGULATION APPARATUS WITH TRANSIENT RESPONSE ENHANCEMENT

(71) Applicant: ELITE SEMICONDUCTOR MEMORY TECHNOLOGY INC., Hsinchu (TW)

(72) Inventor: Yao-Wei Yang, Changhua (TW)

(73) Assignee: ELITE SEMICONDUCTOR MEMORY TECHNOLOGY INC., Hsinchu (TW)

( * ) Notice: Subject to any disclaimer, the term of this patent is extended or adjusted under 35 U.S.C. 154(b) by 86 days.

(21) Appl. No.: 16/790,920

(22) Filed: Feb. 14, 2020

(65) Prior Publication Data

US 2021/0255652 A1 Aug. 19, 2021

(51) Int. Cl.
*G05F 1/575* (2006.01)
*G05F 1/59* (2006.01)
*H02M 3/156* (2006.01)

(52) U.S. Cl.
CPC .............. *G05F 1/575* (2013.01); *G05F 1/59* (2013.01); *H02M 3/156* (2013.01)

(58) Field of Classification Search
CPC ...... H02M 3/156; H02M 3/157; H02M 3/158; H02M 1/0003; H02M 3/1584; H02M 3/1588; G05F 1/575; G05F 1/59
See application file for complete search history.

(56) References Cited

U.S. PATENT DOCUMENTS

| | | | | |
|---|---|---|---|---|
| 8,040,118 B2 * | 10/2011 | Cho | .................. | G05F 1/565 323/273 |
| 10,296,028 B2 * | 5/2019 | Zhang | .................. | G05F 1/575 |
| 10,389,224 B2 * | 8/2019 | Huang | .................. | H02M 3/1584 |
| 2004/0257053 A1 * | 12/2004 | Okubo | .................. | G05F 1/56 323/234 |
| 2011/0115556 A1 * | 5/2011 | May | .................. | G05F 1/618 327/540 |
| 2011/0193539 A1 * | 8/2011 | Schmidt | .................. | H02M 3/156 323/282 |
| 2019/0140635 A1 * | 5/2019 | Abesingha | .................. | H02M 1/38 |

FOREIGN PATENT DOCUMENTS

| | | | |
|---|---|---|---|
| CN | 200979668 Y | | 11/2007 |
| CN | 101893908 A | * | 11/2010 |
| CN | 101893908 B | | 7/2012 |

* cited by examiner

*Primary Examiner* — Thienvu V Tran
*Assistant Examiner* — Shahzeb K Ahmad
(74) *Attorney, Agent, or Firm* — Schmeiser, Olsen & Watts, LLP

(57) ABSTRACT

A termination voltage regulation apparatus with transient response enhancement includes a termination voltage regulator and a transient response enhancer. The termination voltage regulator provides a termination voltage at a termination voltage terminal, including first and second switching units. The transient response enhancer, coupled to the termination voltage regulator, is utilized for enhancing transient response of the termination voltage regulator, including a first enhancement circuit for sensing a first signal associated with the first switching unit and enabling a first control terminal of the first switching unit to be at a first voltage in response to the first signal in a sinking mode; and a second enhancement circuit for sensing a second signal associated with the second switching unit and enabling a second control terminal of the second switching unit to be at a second voltage in response to the second signal in a sourcing mode.

13 Claims, 5 Drawing Sheets

TERMINATION VOLTAGE REGULATION APPARATUS WITH TRANSIENT RESPONSE ENHANCEMENT

BACKGROUND OF THE INVENTION

1. Field of the Invention

The present disclosure relates to a termination voltage regulator, and in particular to a termination voltage regulation apparatus with transient response enhancement.

2. Description of the Related Art

Termination voltage regulator is specifically designed for termination of a bus, such as the memory bus for double data rate memory technology. The termination voltage regulator is required to provide a termination voltage and source and sink current. The transient response may be affected by the operation speed of the termination voltage regulator. If the overshoot and undershoot of the transient response cannot be reduced within corresponding tolerant ranges, the computing system with the memory may be unstable or in crash in the worst case.

Thus, it is desirable to have improvements on the regulator operation speed in order to improve the transient response of the termination voltage regulator.

BRIEF SUMMARY OF THE INVENTION

An objective of the present disclosure is to provide a termination voltage regulation apparatus with transient response enhancement.

To achieve at least the above objective, the present disclosure provides a termination voltage regulation apparatus with transient response enhancement comprises a termination voltage regulator and a transient response enhancer. The termination voltage regulator is utilized for providing a termination voltage at a termination voltage terminal, including a first switching unit and a second switching unit, which are coupled to the termination voltage terminal. The transient response enhancer, coupled to the termination voltage regulator, is utilized for enhancing transient response of the termination voltage regulator, including a first enhancement circuit and a second enhancement circuit. The first enhancement circuit, at least coupled to the first switching unit, is utilized for sensing a first signal associated with the first switching unit, wherein in a sinking mode, the first enhancement circuit enables a first control terminal of the first switching unit to be at a first voltage in response to the first signal while the second switching unit is operable to sink current from the termination voltage terminal. The second enhancement circuit, at least coupled to the second switching unit, is utilized for sensing a second signal associated with the second switching unit, wherein in a sourcing mode, the second enhancement circuit enables a second control terminal of the second switching unit to be at a second voltage in response to the second signal while the first switching unit is operable to source current into the termination voltage terminal.

DETAILED DESCRIPTION OF THE INVENTION

To facilitate understanding of the object, characteristics and effects of this present disclosure, embodiments together with the attached drawings for the detailed description of the present disclosure are provided.

Figure 1:
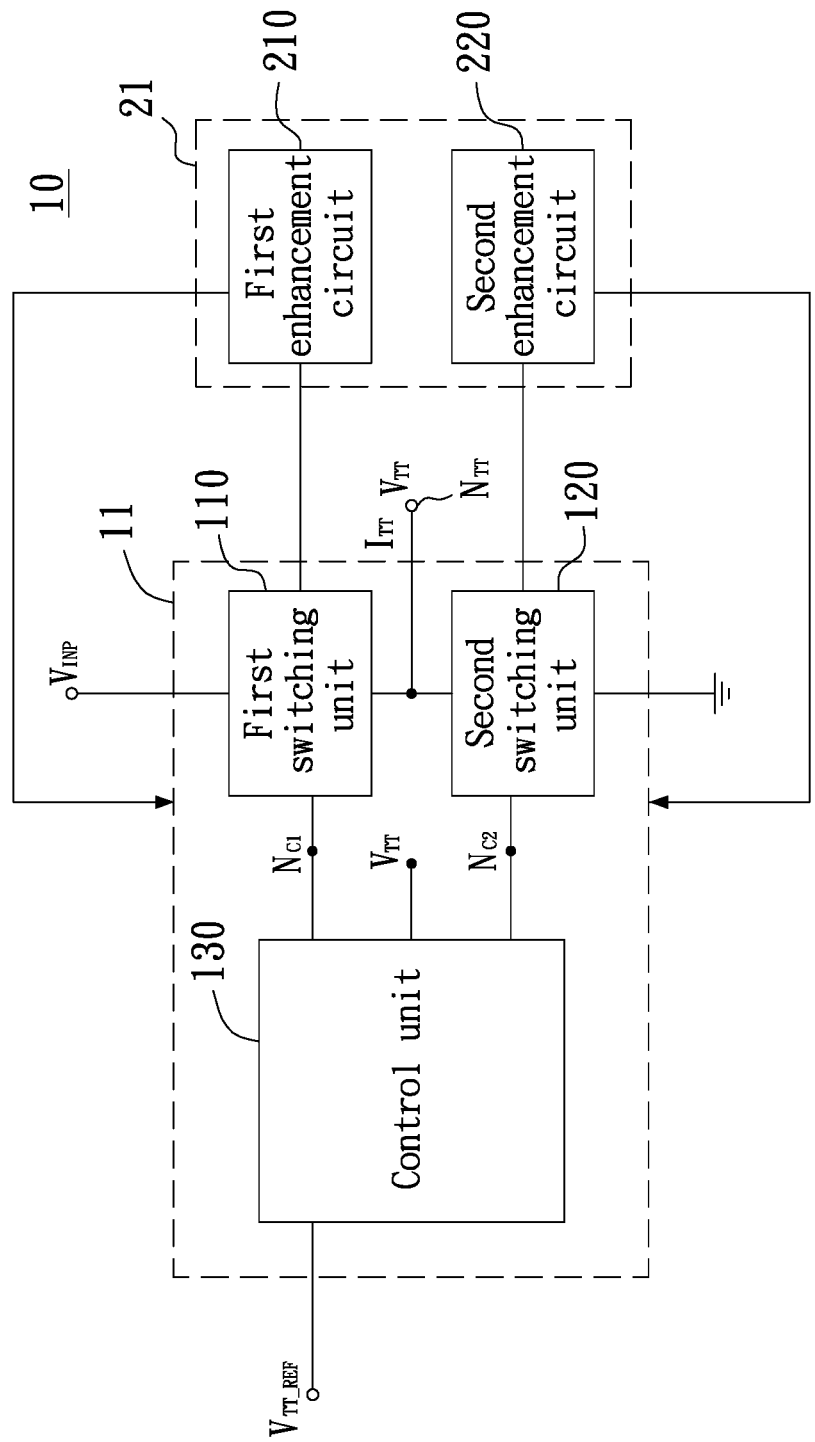
FIG. 1 is a schematic diagram illustrating a termination voltage regulation apparatus with transient response enhancement according to embodiments of the present disclosure.

Referring to FIG. 1, a termination voltage regulation apparatus 10 with transient response enhancement is illustrated according to embodiments of the present disclosure in a schematic diagram. As shown in FIG. 1, the termination voltage regulation apparatus 10 includes a termination voltage regulator 11 and a transient response enhancer 21 coupled to the termination voltage regulator 11. The termination voltage regulation apparatus 10 can be employed to connect to a memory device (not shown), such as a double data rate memory for memory bus termination, for sourcing and sinking current with transient response enhancement.

The termination voltage regulator 11 is used for providing a termination voltage $V_{TT}$ at a termination voltage terminal $N_{TT}$ and includes a first switching unit 110 and a second switching unit 120. The first switching unit 110 is coupled to the termination voltage terminal $N_{TT}$ and has a first control terminal $N_{C1}$. The second switching unit 120 is coupled to the termination voltage terminal $N_{TT}$ and has a second control terminal $N_{C2}$. For example, the first switching unit 110 and the second switching unit 120 are coupled between an input power voltage $V_{INP}$ and a ground (or other power voltage) and configured to operable in a switching manner so as to provide the termination voltage $V_{TT}$ and be able to source and sink current at the termination voltage terminal $N_{TT}$. When the termination voltage regulator 11 sources current, a termination current $I_{TT}$ flows out of the termination voltage terminal $N_{TT}$ (i.e., $I_{TT}>0$) to a load connected (not shown) such as a termination resistor for memory bus termination; when the termination voltage regulator 11 sinks current, the termination current $I_{TT}$ flows into the termination voltage terminal $N_{TT}$ (i.e., $I_{TT}<0$) from the load. For example, the first switching unit 110 and the second switching unit 120 may be configured to operable in a switching manner in response to respective control signals at the first control terminal $N_{C1}$ and second control terminal $N_{C2}$, which may be generated by a control unit 130 based on the termination voltage $V_{TT}$ and a termination reference voltage $V_{TT\_REF}$. Certainly, the implementation of the invention is not limited to the above examples.

The transient response enhancer 21 is utilized for enhancing transient response of the termination voltage regulator 11. The transient response enhancer 21 includes a first enhancement circuit 210 and a second enhancement circuit 220.

The first enhancement circuit 210, at least coupled to the termination voltage regulator 11, is used for sensing a first signal (e.g., voltage or current) associated with the first switching unit 110. In a sinking mode of the termination voltage regulation apparatus 10, the first enhancement circuit 210 enables the first control terminal $N_{C1}$ to be at a first voltage in response to the first signal while the second switching unit 120 is operable to sink the current from the termination voltage terminal $N_{TT}$.

The second enhancement circuit 220, at least coupled to the termination voltage regulator 11, is used for sensing a second signal (e.g., voltage or current) associated with the second switching unit 120. In a sourcing mode of the termination voltage regulation apparatus 10, the second enhancement circuit 220 enables the second control terminal $N_{C2}$ to be at a second voltage in response to the second signal while the first switching unit 110 is operable to source the current into the termination voltage terminal $N_{TT}$.

As such, when the termination voltage regulation apparatus 10 is required to change its operating mode from the sinking mode to the sourcing mode, the first switching unit 110 is capable of operating faster to source current because the first control terminal $N_{C1}$ of the first switching unit 110 is set to the first voltage in advance by way of the first enhancement circuit 210 in the sinking mode. Hence, the voltage undershoot of the termination voltage $V_{TT}$ of the termination voltage regulator 11 can be reduced effectively during the transition from the sinking mode to the sourcing mode.

Conversely, when the termination voltage regulation apparatus 10 is required to change its operating mode from the sourcing mode to the sinking mode, the second switching unit 120 is capable of operating faster to sink current because the second control terminal $N_{C2}$ of the second switching unit 120 is set to the second voltage in advance by way of the second enhancement circuit 220 in the sourcing mode. Hence, the voltage overshoot of the termination voltage $V_{TT}$ of the termination voltage regulator 11 can be reduced effectively during the transition from the sourcing mode to the sinking mode.

For implementation of the termination voltage regulation apparatus 10 with transient response enhancement, the first enhancement circuit 210 or second enhancement circuit 220 of the transient response enhancer 21 can be realized by any suitable circuit configured to enable the control terminal (such as $N_{C1}$, $N_{C2}$) of the corresponding switching unit (such as 110, 120) to be set to a specific voltage in the sourcing mode or sinking mode as exemplified above, in advance of the transition from the sinking to sourcing mode or from the sourcing to sinking mode, wherein the termination voltage regulator 11 may be any active termination voltage regulator including at least two switching units for providing the termination voltage $V_{TT}$ and sourcing and sinking current.

The following provides various embodiments based on the structure and functionality of the termination voltage regulation apparatus 10.

Figure 2:
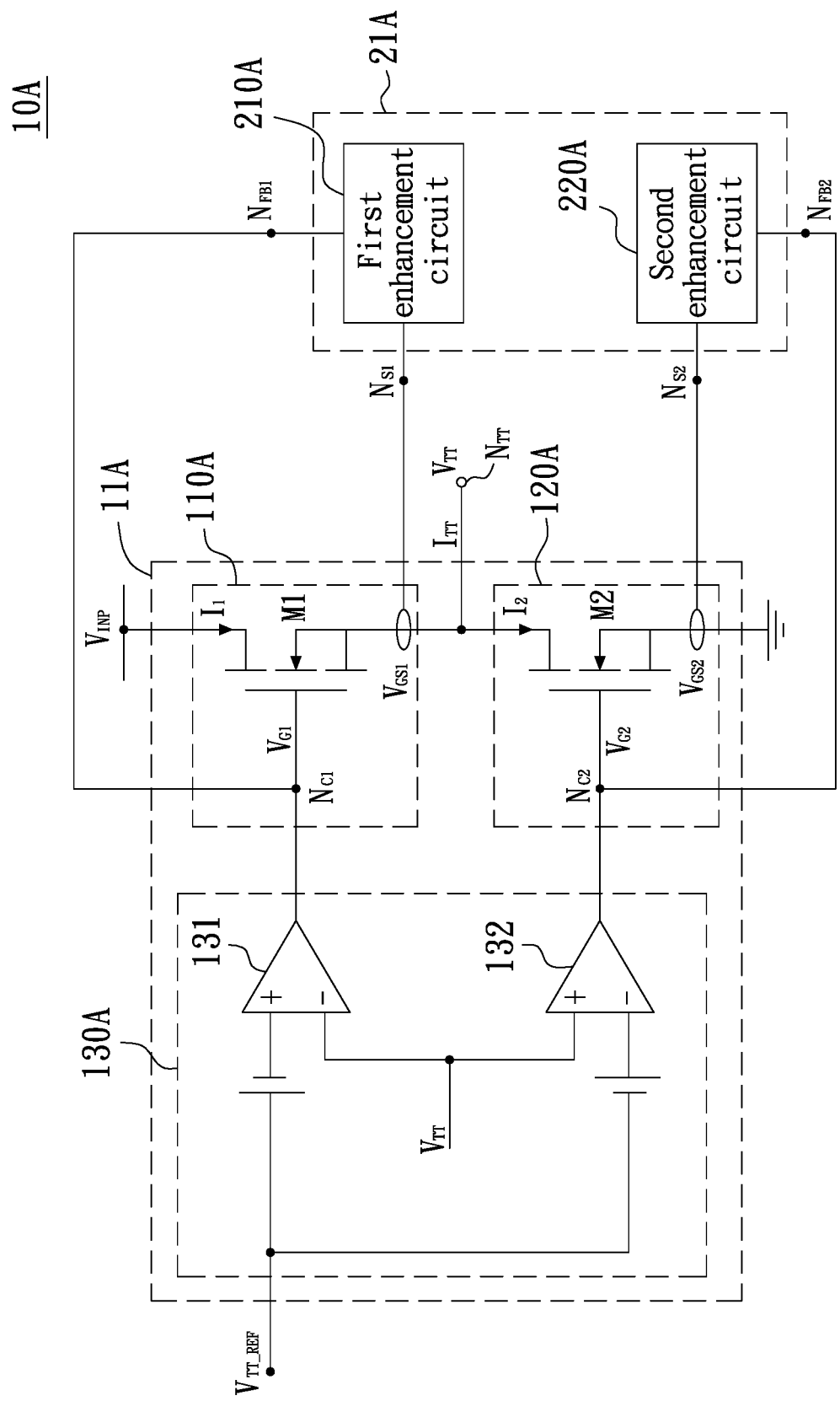
FIG. 2 is a schematic diagram of an embodiment of the termination voltage regulation apparatus based on FIG. 1.

Referring to FIG. 2, a termination voltage regulation apparatus 10A is illustrated according to an embodiment of the termination voltage regulation apparatus 10 of FIG. 1. As shown in FIG. 2, the termination voltage regulation apparatus 10A includes a termination voltage regulator 11A and a transient response enhancer 21A.

The termination voltage regulator 11A includes a first switching unit 110A and a second switching unit 120A. For example, the first switching unit 110A and the second switching unit 120A are transistors M1 and M2 (such as NMOS and/or PMOS) respectively, as exemplified in FIG. 2. In an example, the termination voltage regulator 11A further includes a control unit 130A, coupled to the first control terminal $N_{C1}$ and the second control terminal $N_{C2}$, for turning on the first switching unit 110A and the second switching unit 120A selectively, based on the termination voltage $V_{TT}$ and a termination reference voltage $V_{TT\_REF}$. The control unit 130A, for example, may include comparators 131 and 132, or include error amplifiers or other suitable circuit, for providing output voltages for enabling the first switching unit 110A and the second switching unit 120A selectively. Certainly, the implementation of the invention is not limited to the above examples.

The transient response enhancer 21A is utilized for enhancing transient response of the termination voltage regulator 11A. The transient response enhancer 21A includes a first enhancement circuit 210A and a second enhancement circuit 220A. Specifically, in an example, the first enhancement circuit 210A has a first sensing terminal $N_{S1}$ and a first feedback terminal $N_{FB1}$. The first sensing terminal $N_{S1}$ is coupled or connected to a first terminal of the first switching unit 110A, such as a source terminal of the transistor M1. The first feedback terminal $N_{FB1}$ is coupled or connected to the first control terminal $N_{C1}$ of the first switching unit 110A, such as a gate terminal of the transistor M1.

In an example, the second enhancement circuit 220A has a second sensing terminal $N_{S2}$ and a second feedback terminal $N_{FB2}$. The second sensing terminal $N_{S2}$ is coupled or connected to a first terminal of the second switching unit 120A, such as a source terminal of the transistor M2. The second feedback terminal $N_{FB2}$ is coupled or connected to the second control terminal $N_{C2}$ of the second switching unit 120A, such as a gate terminal of the transistor M2.

In an embodiment, in the sinking mode, the control unit 130A turns on the second switching unit 120A to sink current from the termination voltage terminal $N_{TT}$ and the first enhancement circuit 210A enables the first control terminal $N_{C1}$ to be at the first voltage through the first feedback terminal $N_{FB1}$.

In an embodiment, in the sourcing mode, the control unit 130A turns on the first switching unit 110A to source current into the termination voltage terminal $N_{TT}$ and the second enhancement circuit 220A enables the second control terminal $N_{C2}$ to be at the second voltage through the second feedback terminal $N_{FB2}$.

Figure 3:
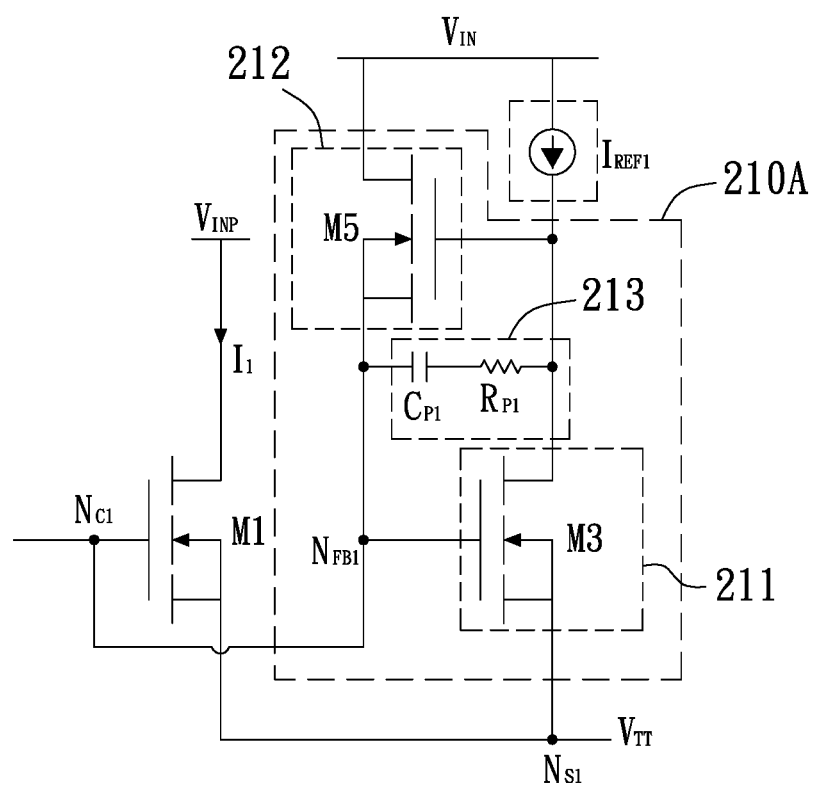
FIG. 3 is a schematic diagram illustrating an embodiment of a first enhancement circuit.
Figure 4:
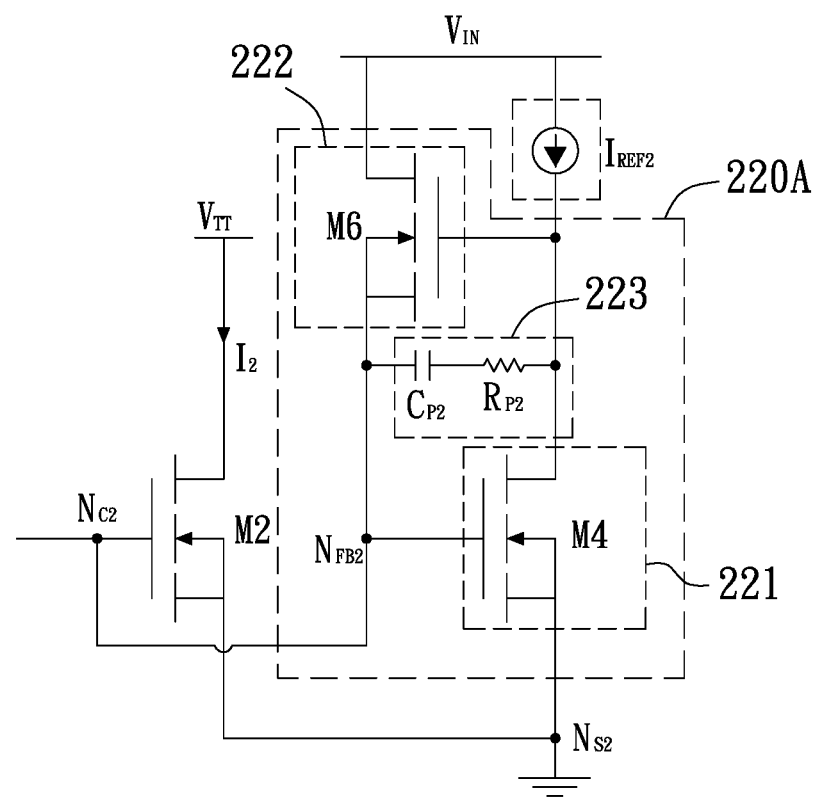
FIG. 4 is a schematic diagram illustrating an embodiment of a second enhancement circuit.

Referring to FIGS. 3 and 4, embodiments of the first enhancement circuit 210A and the second enhancement circuit 220A are illustrated respectively.

In the embodiment as shown in FIG. 3, the first enhancement circuit 210A comprises a first sensing unit 211, a first feedback unit 212, and a first compensation unit 213.

The first sensing unit 211 is used for sensing the first signal, which indicates current of the first switching unit 110, for example, a source current of the transistor M1. The first sensing unit 211, such as a switching unit including a transistor M3 (e.g., NMOS or PMOS or other transistor), has a sensing control terminal, such as a gate terminal of the transistor M3, coupled to the first feedback terminal $N_{FB1}$; a first terminal, such as a source terminal of the transistor M3, coupled to the first sensing terminal $N_{S1}$; and a second terminal, such as a drain terminal of the transistor M3, for receiving a first biasing signal, for example, a biasing current $I_{REF1}$ from a current source.

In addition, in some examples, the first sensing unit 211 can be implemented according to the relationships: $MS_1 = Nb_1 * MS_3$ and $I_1 \leq Nb_1 * I_{REF1}$, wherein $MS_1$ indicates a size of the transistor M1, $MS_3$ indicates a size of the transistor M3, $Nb_1$ is a value according to the design or requirement for the current magnitude of the transistor M1. Certainly, the implementation of the invention is not limited to the examples.

The first feedback unit 212, coupled to the first feedback terminal $N_{FB1}$ and the second terminal of the first sensing unit 211, is utilized for feeding a signal back to the first control terminal $N_{C1}$. For example, the first feedback unit 212 includes a transistor M5 (e.g., NMOS or PMOS or other transistor).

The first compensation unit 213, coupled to the first feedback terminal $N_{FB1}$ and the second terminal of the first sensing unit 211, is utilized for circuit stabilization. For example, the first compensation unit 213 includes a capacitor $C_{P1}$ and a resistor $R_{P1}$.

In the embodiment as shown in FIG. 4, the second enhancement circuit 220A comprises a second sensing unit 221, a second feedback unit 222, and a second compensation unit 223.

The second sensing unit 221 is used for sensing the second signal, which indicates current of the second switching unit 120, for example, a source current of the transistor M2. The second sensing unit 221, such as a switching unit including a transistor M4 (e.g., NMOS or PMOS or other transistor), has a sensing control terminal, such as a gate terminal of the transistor M4, coupled to the second feedback terminal $N_{FB2}$; a first terminal, such as a source terminal of the transistor M4, coupled to the second sensing terminal $N_{S2}$; and a second terminal, such as a drain terminal of the transistor M4, for receiving a second biasing signal, for example, a biasing current $I_{REF2}$ from a current source.

In addition, in some examples, the second sensing unit 221 can be implemented according to the relationships: $MS_2=Nb_2*MS_4$ and $I_2 \leq Nb_2*I_{REF2}$, wherein $MS_2$ indicates a size of the transistor M2, $MS_4$ indicates a size of the transistor M4, $Nb_2$ is a value according to the design or requirement for the current magnitude of the transistor M2.

The second feedback unit 222, coupled to the second feedback terminal $N_{FB2}$ and the second terminal of the second sensing unit 221, is utilized for feeding a signal back to the second control terminal $N_{C2}$. For example, the second feedback unit 222 includes a transistor M6 (e.g., NMOS or PMOS or other transistor).

The second compensation unit 223, coupled to the second feedback terminal $N_{FB2}$ and the second terminal of the second sensing unit 221, is utilized for circuit stabilization. For example, the second compensation unit 223 includes a capacitor $C_{P2}$ and a resistor $R_{P2}$.

In the following, the circuit operations of the first enhancement circuit 210A and the second enhancement circuit 220A are described. For the sake of brevity, the sourcing mode is depicted first. Certainly, the implementation of the invention is not limited to the examples.

Referring to FIGS. 2 and 4, in an embodiment, in the sourcing mode (i.e., $I_{TT}>0$), the control unit 130A, based on the termination voltage $V_{TT}$ and the termination reference voltage $V_{TT\_REF}$, determines to turn on the first switching unit 110A to source current into the termination voltage terminal $N_{TT}$. Meanwhile, the second enhancement circuit 220A enables the second control terminal $N_{C2}$ to be at a second voltage through the second feedback terminal $N_{FB2}$ as follows. Initially, referring to FIG. 4, the second control terminal $N_{C2}$ has a low voltage, approximately to zero, due to the source of the transistor M2 connected to the ground. The voltage at the second control terminal $N_{C2}$ is then increased through the second feedback unit 222 because the transistor M6 is turned on and a looping is formed inside the second enhancement circuit 220A. The voltage at the second control terminal $N_{C2}$, indicated by $V_{G2}$, will be increased to the second voltage (e.g., a value greater than zero, such as 0.6V or other value) in a stable manner due to the second compensation unit 223. For example, the second voltage can be implemented to meet the following relationship $V_{GS2}-V_t=V_{G2}-V_t \geq 0$ such that $V_{G2} \geq V_t$ and $I_1=I_{TT}+I_2$, wherein $V_{GS2}$ indicates the voltage between the gate and source terminals of the transistor M2 and $V_t$ indicates a threshold voltage of the corresponding transistor. Thus, in the sourcing mode (i.e., $I_{TT}>0$), the voltage at the second control terminal $N_{C2}$, indicated by $V_{G2}$, will be increased to the second voltage.

As such, when the termination voltage regulation apparatus 10A is required to change its operating mode from the sourcing mode to the sinking mode, the second switching unit 120A is capable of operating faster to sink current because the second control terminal $N_{C2}$ of the second switching unit 120 is set to the second voltage in advance by way of the second enhancement circuit 220A in the sourcing mode. Hence, the voltage overshoot of the termination voltage $V_{TT}$ of the termination voltage regulator 11A can be reduced effectively during the transition from the sourcing mode to the sinking mode.

Referring to FIGS. 2 and 3, in an embodiment, in the sinking mode (i.e., $I_{TT}<0$), the control unit 130A, based on the termination voltage $V_{TT}$ and the termination reference voltage $V_{TT\_REF}$, determines to turn on the second switching unit 120A to sink current from the termination voltage terminal $N_{TT}$. Meanwhile, the first enhancement circuit 210A enables the first control terminal $N_{C1}$ to be at a first voltage through the first feedback terminal $N_{FB1}$ as follows. Initially, referring to FIG. 3, the first control terminal $N_{C1}$ has a low voltage, approximately to zero. The voltage at the first control terminal $N_{C1}$ is then increased through the first feedback unit 212 because the transistor M5 is turned on and a looping is formed inside the first enhancement circuit 210A. The voltage at the first control terminal $N_{C1}$, indicated by $V_{G1}$, will be increased to the first voltage (e.g., a value greater than zero, such as 1V, 1.1V, 1.2V, 1.3V, 1.8 or other value) in a stable manner due to the first compensation unit 213. For example, the first voltage can be implemented to meet the following relationship $V_{GS1}-V_t=V_{G1}-V_{TT}-V_t \geq 0$ such that $V_{G1} \geq V_{TT}+V_t$ and $I_2=I_{TT}+I_1$, wherein $V_{GS1}$ indicates the voltage between the gate and source terminals of the transistor M1. Thus, in the sinking mode (i.e., $I_{TT}<0$), the voltage at the first control terminal $N_{C1}$ will be increased to the first voltage.

As such, when the termination voltage regulation apparatus 10A is required to change its operating mode from the sinking mode to the sourcing mode, the first switching unit 110A is capable of operating faster to source current because the first control terminal $N_{C1}$ of the first switching unit 110A is set to the first voltage in advance by way of the first enhancement circuit 210A in the sinking mode. Hence, the voltage undershoot of the termination voltage $V_{TT}$ of the termination voltage regulator 11A can be reduced effectively during the transition from the sinking mode to the sourcing mode.

In the embodiments related to FIGS. 2-4, the termination voltage regulation apparatus 10A is exemplified according to the configuration as shown in FIG. 2. However, the implementation of the invention is not limited to the above examples.

Figure 5:
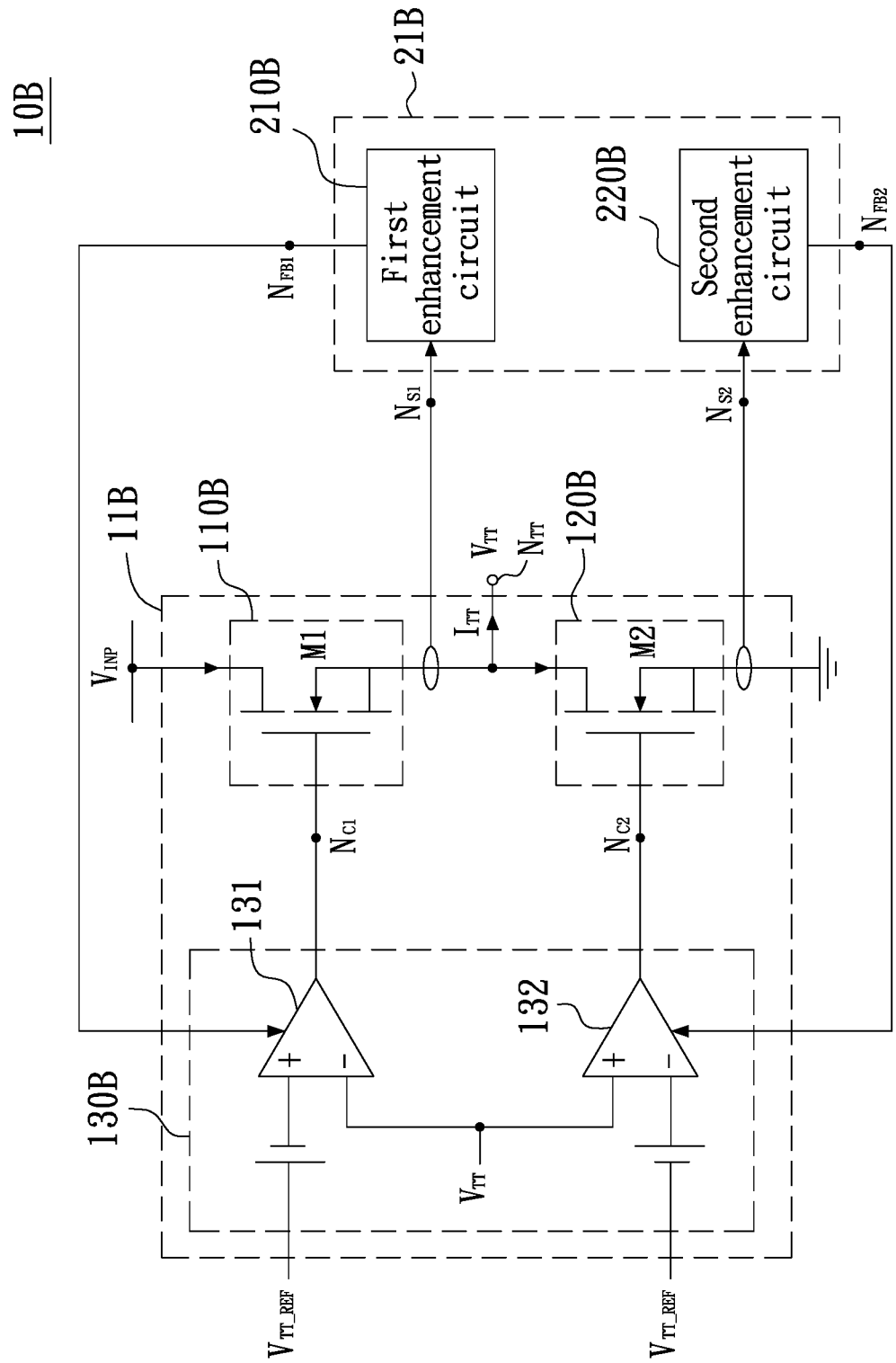
FIG. 5 is a schematic diagram of another embodiment of the termination voltage regulation apparatus based on FIG. 1.

Referring to FIG. 5, a termination voltage regulation apparatus 10B is illustrated according to another embodiment of the termination voltage regulation apparatus 10 of FIG. 1. As shown in FIG. 5, the termination voltage regulation apparatus 10B includes a termination voltage regulator 11B and a transient response enhancer 21B. For example, the termination voltage regulator 11B can be implemented based on the termination voltage regulator 11A shown in FIG. 2 and the transient response enhancer 21B can be implemented based on the transient response enhancer 21A shown in FIG. 2.

In the embodiment as illustrated in FIG. 5, the termination voltage regulation apparatus 10B differs from termination voltage regulation apparatus 10A in that the transient response enhancer 21B enables the control terminal (such as $N_{C1}$, $N_{C2}$) of the corresponding switching unit (such as 110B, 120B) to be set to a specific voltage in the sourcing mode or sinking mode indirectly through the control unit 130B.

In an example, the first feedback terminal $N_{FB1}$ is connected to a control unit 130B of the termination voltage regulator 11B; and in the sinking mode, a first enhancement circuit 210B of the transient response enhancer 21B enables, through the first feedback terminal $N_{FB1}$, the control unit 130B to provide a first voltage so as to enable the first control terminal $N_{C1}$ to be at the first voltage while the control unit 130B turns on the second switching unit 120B to sink current from the termination voltage terminal $N_{TT}$.

In an example, the second feedback terminal $N_{FB2}$ is connected to the control unit 130B; in the sourcing mode, the control unit 130B turns on the first switching unit 110B to source current into the termination voltage terminal $N_{TT}$ and the second enhancement circuit 220B enables, through the second feedback terminal $N_{FB2}$, the control unit 130B to provide the second voltage so as to enable the second control terminal $N_{C2}$ to be at the second voltage.

For examples, the transient response enhancer 21B can be implemented to send a feedback signal through the first feedback terminal $N_{FB1}$ or second feedback terminal $N_{FB2}$ to the control unit 130B configured to receive the feedback signal. In response to the feedback signal received, the control unit 130B enables the corresponding control terminal (such as $N_{C1}$ or $N_{C2}$) of the corresponding switching unit (such as 110B or 120B) to be set to a specific voltage (such as the first or second voltage) in the sourcing mode or sinking mode in advance of the mode transition from the sourcing to sinking mode or vice versa, as exemplified similarly or based on any one of the examples for the termination voltage regulation apparatus (e.g., 10 or 10A), or with modification where appropriate. For example, the control unit 130B has an output circuit stage, including the comparators 131 and 132 (or error amplifiers or other suitable circuit), configured to respond to the feedback signal. For the sake of brevity, the operations of the termination voltage regulation apparatus 10B can be derived similarly and thus will not be repeated.

In further embodiments, the termination voltage regulation apparatus (e.g., 10, 10A or 10B) can be configured to provide a termination voltage at 0.6V, 0.75V, 0.9V or 1.25V, so as to fulfil the requirements of double data rate (DDR) memory standards (such as DDR1, DDR2, DDR3, DDR4, or so on). Certainly, the implementation of the invention is not limited to the above examples.

While the present disclosure has been described by way of specific embodiments, numerous modifications, combinations, and variations could be made thereto by those skilled in the art without departing from the scope and spirit of the present disclosure set forth in the claims.

What is claimed is:

1. A termination voltage regulation apparatus with transient response enhancement comprising:
   a termination voltage regulator for providing a termination voltage at a termination voltage terminal, including a first switching unit and a second switching unit, which are coupled to the termination voltage terminal; and
   a transient response enhancer, coupled to the termination voltage regulator, for enhancing transient response of the termination voltage regulator, including:
   a first enhancement circuit, at least coupled to the first switching unit, for sensing a first signal which indicates a voltage or current of the first switching unit, wherein in a sinking mode, the first enhancement circuit, in advance of mode transition from the sinking mode to a sourcing mode, enables a first control terminal of the first switching unit to be changed to a first voltage through feeding a first feedback signal in response to the first signal while the second switching unit is operable to sink current from the termination voltage terminal; when the termination voltage regulation apparatus performs mode transition from the sinking mode to the sourcing mode, the first switching unit is capable of operating faster to source current due to the first control terminal of the first switching unit having been changed to the first voltage in advance; and
   a second enhancement circuit, at least coupled to the second switching unit, for sensing a second signal which indicates a voltage or current of the second switching unit, wherein in the sourcing mode, the second enhancement circuit, in advance of mode transition from the sourcing mode to the sinking mode, enables a second control terminal of the second switching unit to be changed to a second voltage through feeding a second feedback signal in response to the second signal while the first switching unit is operable to source current into the termination voltage terminal; when the termination voltage regulation apparatus performs mode transition from the sourcing mode to the sinking mode, the second switching unit is capable of operating faster to sink current due to the first control terminal of the first switching unit having been changed to the second voltage in advance.

2. The termination voltage regulation apparatus according to claim 1, wherein the first enhancement circuit has a first sensing terminal coupled to a first terminal of the first switching unit, and a first feedback terminal coupled to the first control terminal of the first switching unit.

3. The termination voltage regulation apparatus according to claim 2, wherein the termination voltage regulator further includes: a control unit, coupled to the first control terminal and the second control terminal, for turning on the first switching unit and the second switching unit selectively, based on the termination voltage and a termination reference voltage.

4. The termination voltage regulation apparatus according to claim 3, wherein the first feedback terminal is connected to the first control terminal of the first switching unit; in the sinking mode, the control unit turns on the second switching unit to sink current from the termination voltage terminal and the first enhancement circuit enables the first control terminal to be at the first voltage through the first feedback terminal.

5. The termination voltage regulation apparatus according to claim 3, wherein the first feedback terminal is connected to the control unit; in the sinking mode, the control unit turns on the second switching unit to sink current from the termination voltage terminal and the first enhancement circuit enables, through the first feedback terminal, the control unit to provide the first voltage so as to enable the first control terminal to be at the first voltage.

6. The termination voltage regulation apparatus according to claim 2, wherein the first enhancement circuit comprises:
- a first sensing unit having a sensing control terminal coupled to the first feedback terminal, a first terminal coupled to the first sensing terminal, and a second terminal for receiving a first biasing signal, wherein the first sensing unit is used for sensing the first signal, which indicates current of the first switching unit;
- a first feedback unit, coupled to the first feedback terminal and the second terminal of the first sensing unit, for feeding the first feedback signal back to the first control terminal; and
- a first compensation unit, coupled to the first feedback terminal and the second terminal of the first sensing unit, for circuit stabilization.

7. The termination voltage regulation apparatus according to claim 1, wherein the second enhancement circuit has a second sensing terminal coupled to a first terminal of the second switching unit, and a second feedback terminal coupled to the second control terminal of the second switching unit.

8. The termination voltage regulation apparatus according to claim 7, wherein the termination voltage regulator further includes a control unit, coupled to the first control terminal and the second control terminal, for turning on the first switching unit and the second switching unit selectively, based on the termination voltage and a termination reference voltage.

9. The termination voltage regulation apparatus according to claim 8, wherein the second feedback terminal is connected to the second control terminal of the second switching unit; in the sourcing mode, the control unit turns on the first switching unit to source current into the termination voltage terminal and the second enhancement circuit enables the second control terminal to be at the second voltage through the second feedback terminal.

10. The termination voltage regulation apparatus according to claim 8, wherein the second feedback terminal is connected to the control unit; in the sourcing mode, the control unit turns on the first switching unit to source current into the termination voltage terminal and the second enhancement circuit enables, through the second feedback terminal, the control unit to provide the second voltage so as to enable the second control terminal to be at the second voltage.

11. The termination voltage regulation apparatus according to claim 7, wherein the second enhancement circuit comprises:
- a second sensing unit having a sensing control terminal coupled to the second feedback terminal, a first terminal coupled to the second sensing terminal, and a second terminal for receiving a second biasing signal, wherein the second sensing unit is used for sensing the second signal, which indicates current of the second switching unit;
- a second feedback unit, coupled to the second feedback terminal and the second terminal of the second sensing unit, for feeding the second feedback signal back to the second control terminal; and
- a second compensation unit, coupled to the second feedback terminal and the second terminal of the second sensing unit, for circuit stabilization.

12. A termination voltage regulation apparatus with transient response enhancement comprising:
- a termination voltage regulator for providing a termination voltage at a termination voltage terminal, including a first switching unit and a second switching unit, which are coupled to the termination voltage terminal; and
- a transient response enhancer, coupled to the termination voltage regulator, for enhancing transient response of the termination voltage regulator, including:
- a first enhancement circuit, at least coupled to the first switching unit, for sensing a first signal associated with the first switching unit, wherein in a sinking mode, the first enhancement circuit enables a first control terminal of the first switching unit to be at a first voltage in response to the first signal while the second switching unit is operable to sink current from the termination voltage terminal; and
- a second enhancement circuit, at least coupled to the second switching unit, for sensing a second signal associated with the second switching unit, wherein in a sourcing mode, the second enhancement circuit enables a second control terminal of the second switching unit to be at a second voltage in response to the second signal while the first switching unit is operable to source current into the termination voltage terminal;
- wherein the first enhancement circuit has a first sensing terminal coupled to a first terminal of the first switching unit, and a first feedback terminal coupled to the first control terminal of the first switching unit;
- wherein the first enhancement circuit comprises:
- a first sensing unit having a sensing control terminal coupled to the first feedback terminal, a first terminal coupled to the first sensing terminal, and a second terminal for receiving a first biasing signal, wherein the first sensing unit is used for sensing the first signal, which indicates current of the first switching unit;
- a first feedback unit, coupled to the first feedback terminal and the second terminal of the first sensing unit, for feeding a signal back to the first control terminal; and
- a first compensation unit, coupled to the first feedback terminal and the second terminal of the first sensing unit, for circuit stabilization.

13. A termination voltage regulation apparatus with transient response enhancement comprising:
- a termination voltage regulator for providing a termination voltage at a termination voltage terminal, including a first switching unit and a second switching unit, which are coupled to the termination voltage terminal; and
- a transient response enhancer, coupled to the termination voltage regulator, for enhancing transient response of the termination voltage regulator, including:
- a first enhancement circuit, at least coupled to the first switching unit, for sensing a first signal associated with the first switching unit, wherein in a sinking mode, the first enhancement circuit enables a first control terminal of the first switching unit to be at a first voltage in response to the first signal while the second switching unit is operable to sink current from the termination voltage terminal; and
- a second enhancement circuit, at least coupled to the second switching unit, for sensing a second signal associated with the second switching unit, wherein in a sourcing mode, the second enhancement circuit enables a second control terminal of the second switching unit to be at a second voltage in response to the second signal while the first switching unit is operable to source current into the termination voltage terminal;
- wherein the second enhancement circuit has a second sensing terminal coupled to a first terminal of the second switching unit, and a second feedback terminal coupled to the second control terminal of the second switching unit;

wherein the second enhancement circuit comprises:

a second sensing unit having a sensing control terminal coupled to the second feedback terminal, a first terminal coupled to the second sensing terminal, and a second terminal for receiving a second biasing signal, wherein the second sensing unit is used for sensing the second signal, which indicates current of the second switching unit;

a second feedback unit, coupled to the second feedback terminal and the second terminal of the second sensing unit, for feeding a signal back to the second control terminal; and a second compensation unit, coupled to the second feedback terminal and the second terminal of the second sensing unit, for circuit stabilization.

\* \* \* \* \*